(12) United States Patent
Stone

(10) Patent No.: US 6,914,231 B1
(45) Date of Patent: Jul. 5, 2005

(54) OPTICAL SHUFFLE/INTERCONNECT SYSTEM

(75) Inventor: Thomas W. Stone, Hellertown, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 279 days.

(21) Appl. No.: 10/027,220

(22) Filed: Dec. 21, 2001

Related U.S. Application Data

(63) Continuation-in-part of application No. 09/425,551, filed on Oct. 22, 1999, now Pat. No. 6,635,861.
(60) Provisional application No. 60/105,251, filed on Oct. 22, 1998.

(51) Int. Cl.[7] ................................................. H01J 3/14
(52) U.S. Cl. ................................. 250/216; 250/227.24
(58) Field of Search ........................... 250/216, 227.11, 250/227.21, 227.24, 227.28, 237 R, 237 G; 385/16, 18, 36, 37, 34, 124; 359/566

(56) References Cited

U.S. PATENT DOCUMENTS

| | | | | |
|---|---|---|---|---|
| 4,931,959 A | * | 6/1990 | Brenner et al. | 359/107 |
| 5,165,104 A | * | 11/1992 | Weverka | 385/7 |
| 5,892,620 A | * | 4/1999 | Stone | 359/566 |

* cited by examiner

*Primary Examiner*—Que T. Le
(74) *Attorney, Agent, or Firm*—Perkins Smith & Cohen LLP; Jacob N. Erlich; Orlando Lopez

(57) ABSTRACT

An optical shuffle/interconnect system having an imaging system defining an input image plane and an output image plane. An optical perfect shuffle is combined with the imaging system for rearranging spatial components of an object located proximate the input image plane into a rearranged image within the output image plane. The optical perfect shuffle having at least one surface used for rearranging of said spatial components incident on the at least one surface of the optical perfect shuffle.

15 Claims, 15 Drawing Sheets

OPTICAL SHUFFLE/INTERCONNECT SYSTEM

CROSS REFERENCE TO RELATED APPLICATIONS

This application is a continuation-in-part of U.S. patent application Ser. No. 09/425,551 entitled RELAXED TOLERANCE OPTICAL INTERCONNECT SYSTEMS filed Oct. 22, 1999, now U.S. Pat. No. 6,635,861 which claims priority of Provisional Application Ser. No. 60/105,251 filed Oct. 22, 1998, both of which being incorporated herein by reference.

STATEMENT OF GOVERNMENT INTEREST

This invention was partially funded and made under Air Force Contract No. F-08630-97-C-0048 and the U.S. Government has certain rights in this invention.

FIELD OF THE INVENTION

This invention relates generally to spatial shuffle devices, and, more particularly, to an optical perfect shuffle device utilized in conjunction with an optical interconnect to form an optical shuffle/interconnect system.

BACKGROUND OF THE INVENTION

The "perfect" shuffle is a pervasive interconnect that is used throughout switching applications. Frequently, the "perfect" shuffle is used in high level descriptions of systems, whereas a different interconnect is used in implementations because of the difficulty of implementing a perfect shuffle well using electronics. While "perfect" shuffle devices are useful architecturally, they provide a space-variant interconnect pattern that is difficult to implement optically in an efficient, compact manner. Typical approaches for optically implementing perfect shuffles include splitting, magnifying, and interleaving the resultant images using interferometers or the use birefringent crystals. In a typical micro-optic approach, individual channels are reshuffled using holographic microlenses. A significant improvement to producing optical perfect shuffles was introduced in the image plane perfect shuffle of U.S. Pat. No. 5,892,620 entitled OPTICAL PERFECT SHUFFLE by the present inventor, which is incorporated herein by reference. This perfect shuffle provides a significantly more compact device than prior optical perfect shuffle devices. However, even this optical shuffle lacks the compactness and alignment tolerances needed with some of today's optical systems. For practical application of perfect shuffles, shuffle devices that are both compact and alignment tolerant are required. The compactness is required so that the devices can be located on circuit boards or inside modules. Similarly, tolerance of optical misalignments is needed because angular accuracies on the order of a degree and positional accuracies of the order of a millimeter are tolerable for components in computers or processors, but many existing shuffle or interconnect technologies require accuracies that are one to three orders of magnitude more stringent.

It is therefore an object of this invention to provide an optical shuffle/interconnect system.

It is another object of this invention to provide an optical shuffle/interconnect system with compactness and performance improved through the use of gradient index rod lenses.

It is a further object of this invention to provide an optical shuffle/interconnect system in which the shuffle device is incorporated into an imaging system for greater compactness.

It is a still further object of this invention to provide an optical shuffle/Interconnect system in which alignment tolerances are greatly reduced.

SUMMARY OF THE INVENTION

The objects set forth above as well as further and other objects and advantages of the present invention are achieved by the embodiments of the invention described hereinbelow.

The present invention overcomes problems associated with past shuffles by providing an optical shuffle/interconnect system with improved compactness and alignment tolerance through the use of interconnect or optical data pipe technology of the type described in co-pending U.S. patent application Ser. No. 09/425,551 assigned to the owner of the present invention. U.S. patent application Ser. No. 09/425,551 is also incorporated herein by reference.

It should be noted that as used in the following description in this application, although the term "optical data pipe" refers to single (imaging) and double (infinite conjugate) gradient index rod lens relaxed tolerance optical interconnect devices of the type described in U.S. patent application Ser. No. 09/425,551, the term may also include related optical devices for dense optical interconnects including those using fiber arrays or imaging fiber arrays.

In a typical mode of operation, the optical shuffle/interconnect system of the present invention operates as follows. An input array of beams (also referred to as an object), as may originate from a collection of optical channels carrying digital or analog information, is imaged onto an output plane where detectors or other devices are arranged, or in the alternative, are cascaded. This output plane is also described in the present invention as the output array, image plane or detector plane. Since the shuffle/interconnect system is proximate the image plane, the rays from different spatial regions of the input are localized near corresponding locations in the image. The optical perfect shuffle device utilized within this invention is placed directly in front of the image plane, intercepts localized rays of light, and redistributes them spatially in the image plane. For the case of the perfect shuffle, ray bundles at the edge of the input plane (intersecting the device at the image plane) are not translated. The closer the ray bundles are to the vertex of the device, the more they are translated, resulting in the perfect shuffle pattern of spatial distribution in the output plane. When this technique is incorporated in gradient index rod lens interconnect systems (optical data pipes), much improved compactness and tolerance to misalignments among the host components (e.g., computer boards, modules, or chips) can be obtained. While the perfect shuffle/interconnect system has been described with specific embodiments of this invention, other variations are possible within the scope of this invention.

Although not to be construed as a limitation of the present invention, one of many advantages of the optical shuffle/interconnect system of this invention is that it can be pre-aligned and fixed during manufacture (e.g., using automated alignment and cementing procedures) to produce optical shuffle/interconnects that have greatly relaxed alignment tolerances and are thus readily usable in the field by non-optical personnel. The devices and systems of the present invention are thus tolerant of handling, bending and displacements among interconnected components without losing their function of interconnecting many closely packed (dense) optical channels. Other advantages of this invention relate to the fact that it is tolerant of misalignments, vibrations, etc.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

Figure 1:
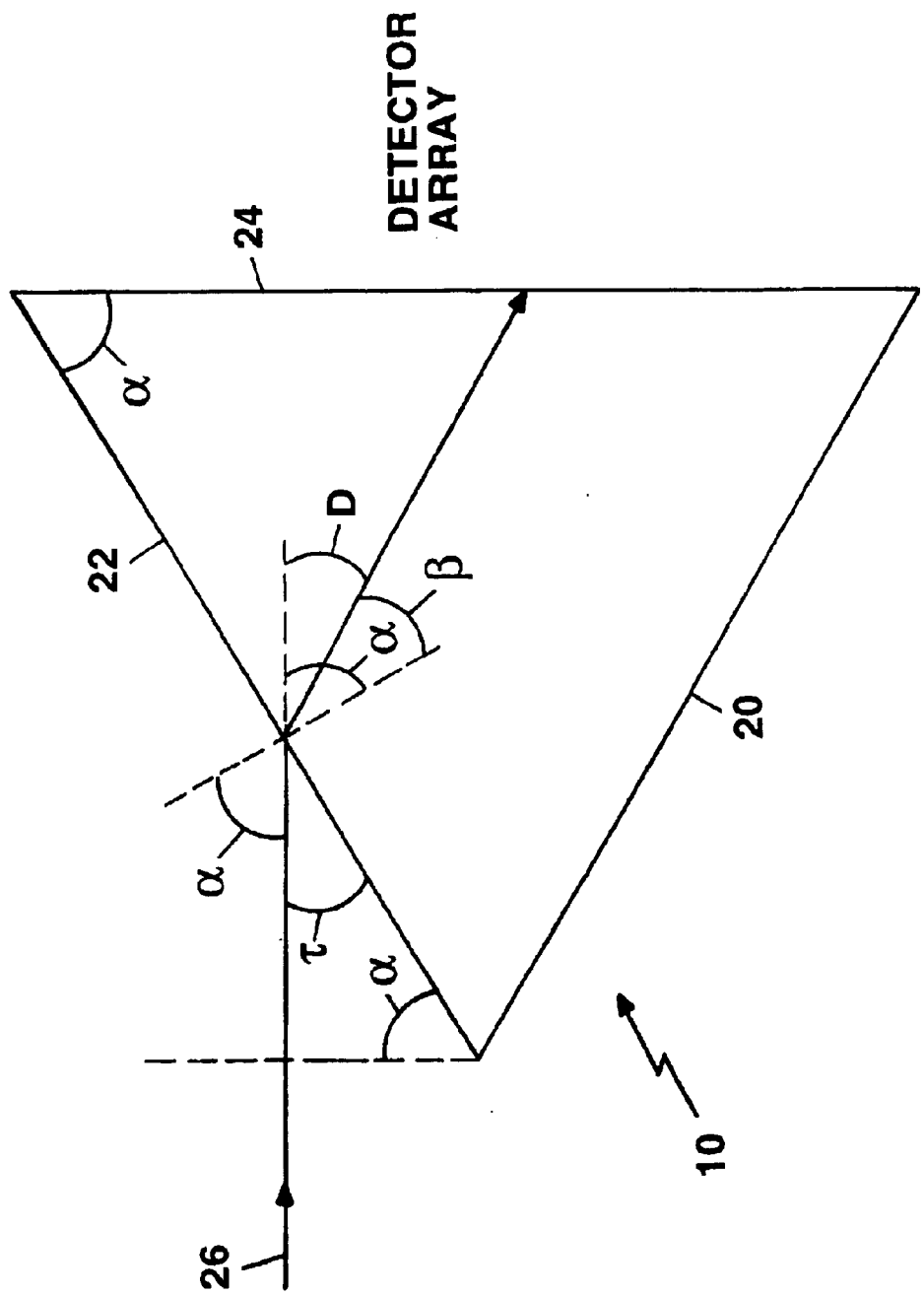
FIG. 1 is a prior art geometrical representation of the concept providing the basis of the optical perfect shuffle device.

The optical shuffle/interconnect system of this invention operates on a 1- or 2-dimensional array of optical beams or spots of light and permutes the order of them in a well defined manner. In the embodiments shown, this reordering of the spot locations provides an optical means for implementing the interconnect topology known as the "perfect shuffle." For the case of a 2-dimensional input of beams or spots, the shuffle/interconnect system of this invention can perform a perfect shuffle in either 1- or 2-dimensions. The interconnection topology for the 1-dimensional perfect shuffle is shown in the drawings. Two dimensional perfect shuffles can be implemented in directly analogous configurations of image plane devices. Although this invention embodies perfect and other types of shuffles, for convenience, the terms "shuffle" and "perfect shuffles" may be used interchangeably throughout the following description.

The basic concept of the optical shuffle/interconnect system of this invention relies upon the type of optical image plane perfect shuffle 10 shown geometrically in FIG. 1 and as described in U.S. Pat. No. 5,892,620 which is incorporated herein by reference. As shown therein, in the image plane perfect shuffle two or more diffracting or refracting surfaces 20 and 22 are positioned symmetrically over or proximate the image plane 24. The channels or spatial components of the input object are then deviated or rearranged by these surfaces 20 and 22 as described below. Any conventional detector array may be located at the image plane 24. The angle of inclination of these surfaces, $\alpha$, is an important parameter in the optimization of the device 10, but is to first order independent of its function. As shown in FIG. 1, the central requirement is that the incident light 26 be deviated by an angle D such that it propagates parallel to the opposite side of the device. Using the notation shown in the figure, D must be given by:

$$D = \pi/2 - \alpha \quad (1)$$

where the angles are expressed in radians. This equation is a first-order constraint on the configuration. When this condition is met and an array of beams is imaged onto the image plane 24, the soots from one half of the field can be spread over the entire plane and interlaced with spots from the other half field. This operation forms a perfect shuffle of the imaged optical channels.

Figure 2:
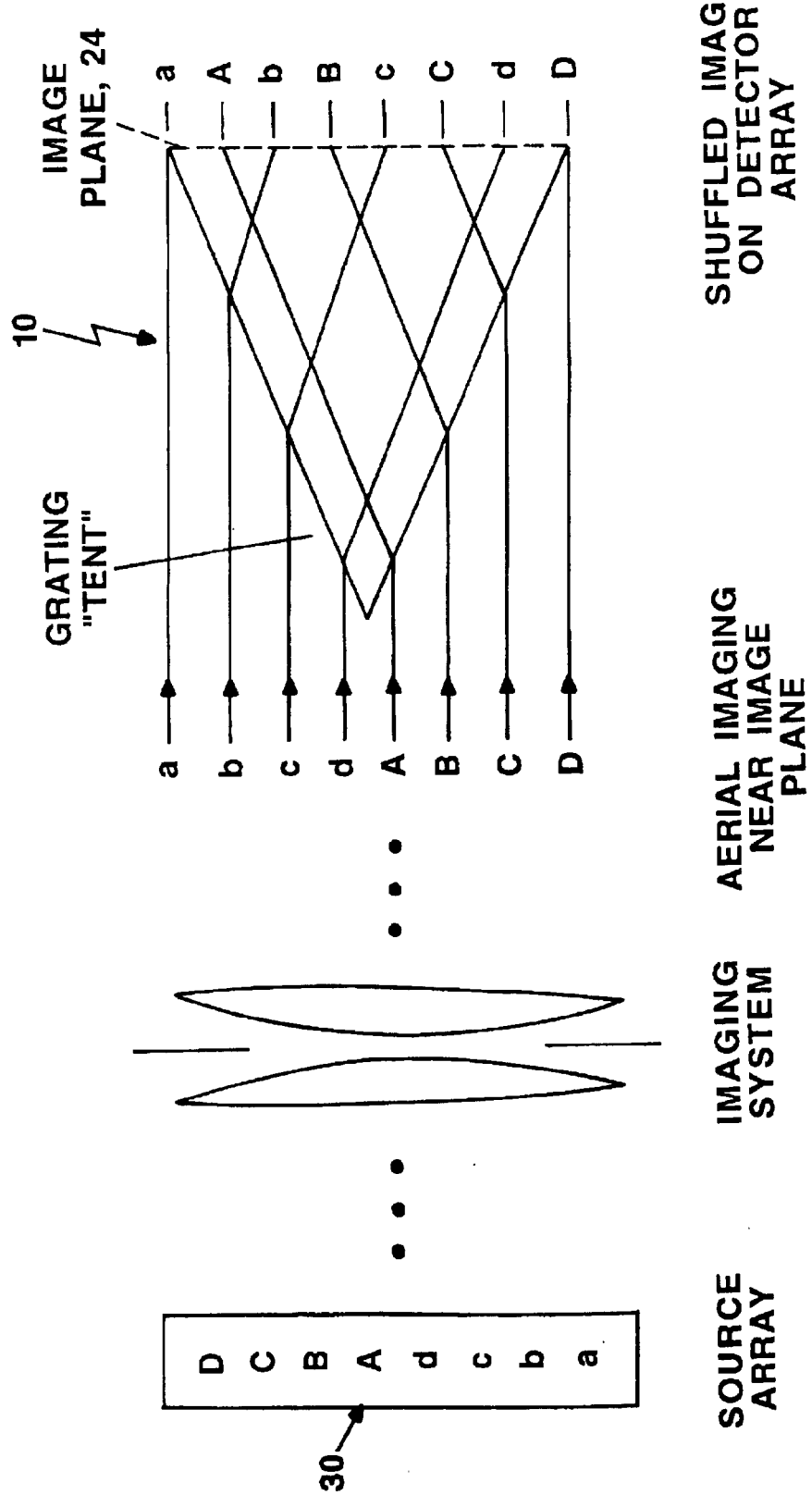
FIG. 2 is a system representation of the components utilized with the optical perfect shuffle device of the prior art.

The formation of the perfect shuffle by imaging through device 10 is illustrated in FIG. 2. Here an object array of sources 30 are labeled a–d across the first half of the field and A–D across the second. This source array 30 is imaged on to the optical perfect shuffle device 10, in the form of, for example a grating tent or refractive prism, and the sources in each half field are deviated by equal and opposite angles. However, the edge channels a and D are in contact with the detector plane, and so no net translation is imposed. It is a different case with the other channels, where the closer to the apex they become, the farther from the detector plane they are, and thus experience progressively larger and larger lateral translations. This interlacing effect rearranges the locations of the spots such that the sequence is now aAbBcCdD-the perfect shuffle operation on the input sequence abcdABCD.

The angular deviation required in the image plane perfect shuffle device 10 may be introduced by refraction from one media into another. The simplest case of this configuration is when a prism is in contact with the image plane 24. If the face of the prism is tilted by "tent angle" with respect to the detector array.

The image plane perfect shuffle device relies on refractive or diffractive surfaces that are inclined at an angle in the vicinity of the image plane. Typically these surfaces are symmetric and take on the appearance of a "tent" or wedge with a base resting on the image plane. The inclination of these "tent" surfaces may range between extremes of either shallow (hugging the image plane) or peaked (sharply rising away from the image plane). Many tradeoffs are affected by this degree of inclination, as described below. Consequently, the angle a may also be referred to as the tent angle.

It is seen from FIG. 1 that the angle of incidence of an axial ray is also $\alpha$. With the prism of refractive index $n_2$ surrounded by a medium of refractive index $n_1$, Snell's law provides the second constraint on the configuration:

$$n_1 \sin \alpha = n_2 \sin \beta \quad (2)$$

where $\beta$ is the angle of refraction at the interface. From FIG. 2 it is also clear that the deviation angle D may be expressed in terms of the incident and refracted angles as:

$$D = \alpha - \beta \quad (3)$$

Setting Eqs. 1 and 3 equal and using Eq. 2 to express in terms of $\alpha$ and the refractive indices, the face angle of the prism may be expressed as a variable governed only by the parameters of n1 and n2

$$2\alpha - \pi/2 - \sin^{-1}[n_1/n_2 \sin \alpha] = 0 \quad (4)$$

In the following discussion it is assumed that the prism is in air, and so the tent angle a of the prism is determined completely by choice of prism refractive index. Considering first the limiting cases, it is seen that a refractive index of unity corresponds to a tent angle of 90°. This is the trivial case where the prism does not physically exist, the two prism faces are parallel, and at a tent angle of 90° the "refracted" angle is trivially parallel to the other prism face. At the other extreme, an infinitely high refractive index causes the refracted ray to emerge on the surface normal, and thus a tent angle of 45° is the solution for the refracted ray to be parallel to the opposite prism face.

It is particularly interesting that when the tent angle reaches 60° in the refractive index range of common refractive materials. Specifically, when the refractive index is $n_2 = 1.732$, the tent angle is 60°. Depending on wavelength used, many optical glasses (e.g., Schott SF10, SF53, LaK N16, LaF N8, BaSF 54) exhibit this refractive index. Glasses with this refractive index will provide an added benefit of a lower fabrication cost, since many test surfaces are available with angles that are multiples of 30°. Surface reflections can be eliminated by choosing a refractive index such that Brewster's angle is obtained at the refractive interface.

The refractive approach in providing the optical perfect shuffle device 10 is tightly constrained, in that the refractive index of the material used in the prism dictates a single solution for the angle of the prism, and therefore fixes the physical geometry. As an alternate embodiment, when diffractive elements are used in a grating tent, the tent angle $\alpha$ is now unconstrained and a solution can be obtained for a broad range of angles. This follows since, as shown in FIG. 2, the spatial period of the grating can be chosen to match the incident angle to the desired diffracted angle (Eq. 1) independently of the angle of the grating surface. With a broad range of geometries now possible, higher order considerations may be optimized in the choice of $\alpha$.

Very small values of $\alpha$ result in flat geometries where the diffracted angle is very large. This condition enhances wavelength sensitivities (increases dispersion) and tightly constrains the bandwidth of the light used. Further, there is a large variation in optical path between the edge rays and vertex rays The edge rays travel directly to the image plane 24, while in the limiting case, the vertex rays can travel paths that are up to half the field width longer. This can put an unrealistic demand on the depth of focus required in the imaging stage to maintain acceptable spot diameters.

At the other end of the tradeoff, very large values of $\alpha$ create a highly peaked geometry in which the vertex of the grating tent protrudes a significant distance toward the imaging lenses. This is undesirable for many reasons, chief of which is that the image plane locality is lost and the ray bundles for each optical channel become wide in the vertex region. When this occurs optical channels near the center of the field partly overlap the wrong grating, and spurious signals are generated.

It is clear that the intermediate values of $\alpha$ are desirable for the image plane optical perfect shuffle device 10 geometry. When volume diffraction gratings are used in the device, however, there is a practical factor that can be dominant in choosing the value of $\alpha$. Volume diffraction gratings rely on alignment of the Bragg planes in the grating for high efficiency. When the gratings are fabricated at the same wavelength and angles at which they will be used, these Bragg planes are inherently aligned during exposure for peak efficiency. However, most recording materials including dichromated gelatin and photopolymers typically shrink or expand during processing, resulting in a net rotation of these Bragg planes. This angular detuning is a function of the departure of the Bragg planes from the normal to the substrate. For Bragg planes at 45° to the substrate, the detuning is most sensitive to shrinkage and expansion of the recording material. When perpendicular or parallel to the substrate normal, however, there is no angular detuning of the Bragg planes with swelling or shrinking. Since the diffraction efficiency decreases very rapidly with this Bragg plane detuning, choosing a geometry such that the Bragg planes are normal to the substrate can be very useful. The Bragg planes are normal to the substrate when the angle of diffraction is equal to the angle of incidence. The simultaneous solution for this constraint and that of Eq. 1 is readily shown to occur when $\alpha = 30°$.

In the image plane perfect shuffle device configurations described above it is assumed that the devices 10 are in contact with a plane containing an array of detectors or devices. As long as the devices in the array are not very sensitive to the incident angle of optical flux, it is of little consequence that alternating optical channels arrive from alternate (but equal) angles. For some devices, however, this might not be the case. Further it can be very useful to perform a perfect shuffle on an array of optical channels and then to cascade them with other systems without direct detection. These latter two cases can be accommodated by placing an array of stripe gratings 50 in the image plane in order to realign the shuffled optical channels.

Figure 3:
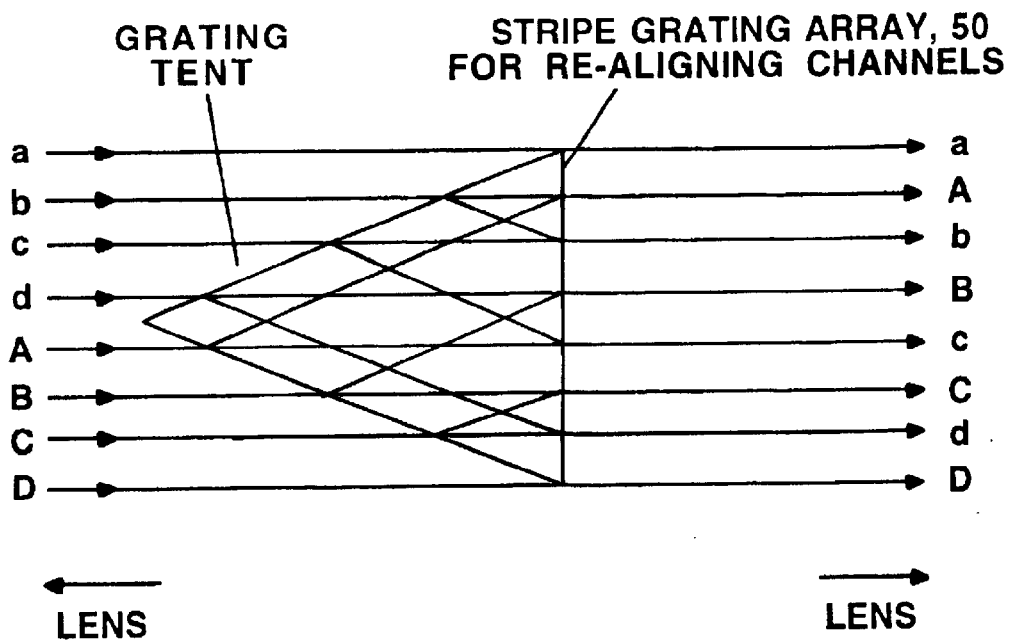
FIG. 3 is a schematic representation of a cascadable diffractive optical perfect shuffle device of the prior art.

The use of a grating array 50 with striped pixelation for redirecting the shuffled channels back on axis is illustrated in FIG. 3. The grating array is located in or near the image plane and diffracts alternating channels in opposite directions. The shuffled array of optical channels then continues to defocus and propagate toward the next imaging lens. Successive stages can then be cascaded. Defocus variations and other aberrations must be corrected to a higher degree when multiple stages are cascaded without beam regeneration.

Figure 4:
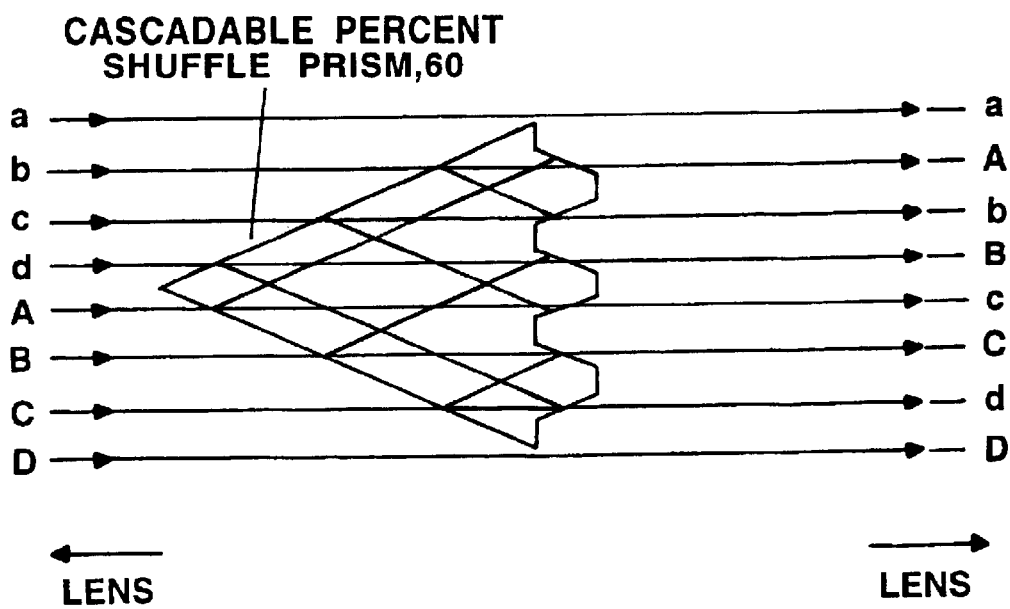
FIG. 4 is a schematic illustration of a cascadable refractive optical perfect shuffle device of the prior art with the facets in the exiting face of the prism parallel to alternate sides of the prism.

Although a single grating can be placed in the image plane to accomplish the redirection, using pixelated gratings 50 allows the use of highly efficient elements that can exhibit diffraction efficiencies of nearly 100%. In the refractive approach, the rear surface of the prism 60 can be faceted in order to realign the channels. This is illustrated in FIG. 4.

The primary advantages of the refractive and diffractive image plane perfect shuffle devices utilized in this invention are their nearly ideal efficiency, compactness, and simplicity. The advantages of this invention are accompanied by tradeoffs and potential limitations. For example, imaging through the tilted gratings or prism faces gives rise to aberrations that must be controlled or balanced. One approach is to limit the numerical aperture of the rays so the aberrations are acceptable and the depth of focus accommodates the variation of path lengths across the aperture of the device. In the current invention compensating aberrations can be designed into the gradient index rod lenses. Alternatively, it is advantageous in some cases to introduce compensating elements in the imaging lens or near the image plane. For example, field curvature can be introduced to compensate for the variation in path lengths introduced by the device.

Another consideration is the magnification which may be introduced by imaging through the tilted elements. This anamorphic magnification is similar to that introduced by Brewster telescopes. While it is possible to compensate this magnification for extended images, the application of this device for optical interconnection typically involves the shuffling of many optical channels that are focused to spots. In this application the magnification may not be a detriment since the focused channels will not overlap. Correction may be required, however, where spot sizes must be maintained at a minimum, for example for devices with minimized apertures for speed considerations. Finally, as the numerical aperture of the imaging system increases, pixels near the vertex of the field will be subject to spurious splitting as discussed earlier.

A typical operation of the optical image plane perfect shuffle device 10 utilized in this invention is provided in detail in the above-referred to U.S. Pat. No. 5,892,620.

The image plane perfect shuffle configurations described herein are highly efficient, compact, and simple. They can be implemented with either conventional diffractive, reflective or refractive elements, and can either be used in contact with an image plane or detector plane, or can be cascaded. Refractive versions can be fabricated with simple-to-manufacture angles, or at Brewster's angle to eliminate interface reflection losses. Diffractive elements give wider flexibility for the tent angles, and if volume diffractive elements are used, a tent angle of 30 degrees eliminates the efficiency losses resulting from recording material thickness changes during processing. Tradeoffs include the need to limit numerical apertures in the imaging stage (at least near the vertex) and the need to compensate for optical path variations across the field and other aberrations. It should also be noted that switchable nonlinear gratings can be used to replace the diffractive elements of the optical image plane perfect shuffle device 10 and the cascaded volume gratings within the scope of this invention.

If an optical interconnect approach is to have a significant impact in practice, it must possess a variety of desirable characteristics including in particular a tolerance for misalignments and alignment variations among the interconnected components. These areas are highlighted and described briefly hereafter:

Alignment Tolerance, with the ability to function in a practical computer environment which is subject to vibrations, thermal variations, misalignments between interconnected components and devices, etc.

High channel density: allowing for hundreds of parallel channels to be interconnected with a small footprint.

High channel bandwidth: allowing for data rates in the megahertz and gigahertz regimes.

Low insertion loss: allowing for high speeds with low power consumption.

Uniform delay for all data channels, therefore introducing little or no relative skew in the switched signals.

Miniaturized opto-electronics interconnecting many parallel optical channels in a compact package. The ability to densely pack channels in a volume (e.g., a slender flexible rod) rather than along planar substrate or circuit board surface will be a distinct advantage.

Low crosstalk between neighboring optical data channels.

Monolithic packaging for ruggedness and low insertion loss.

Scalability to large numbers of data channels.

Figure 5:
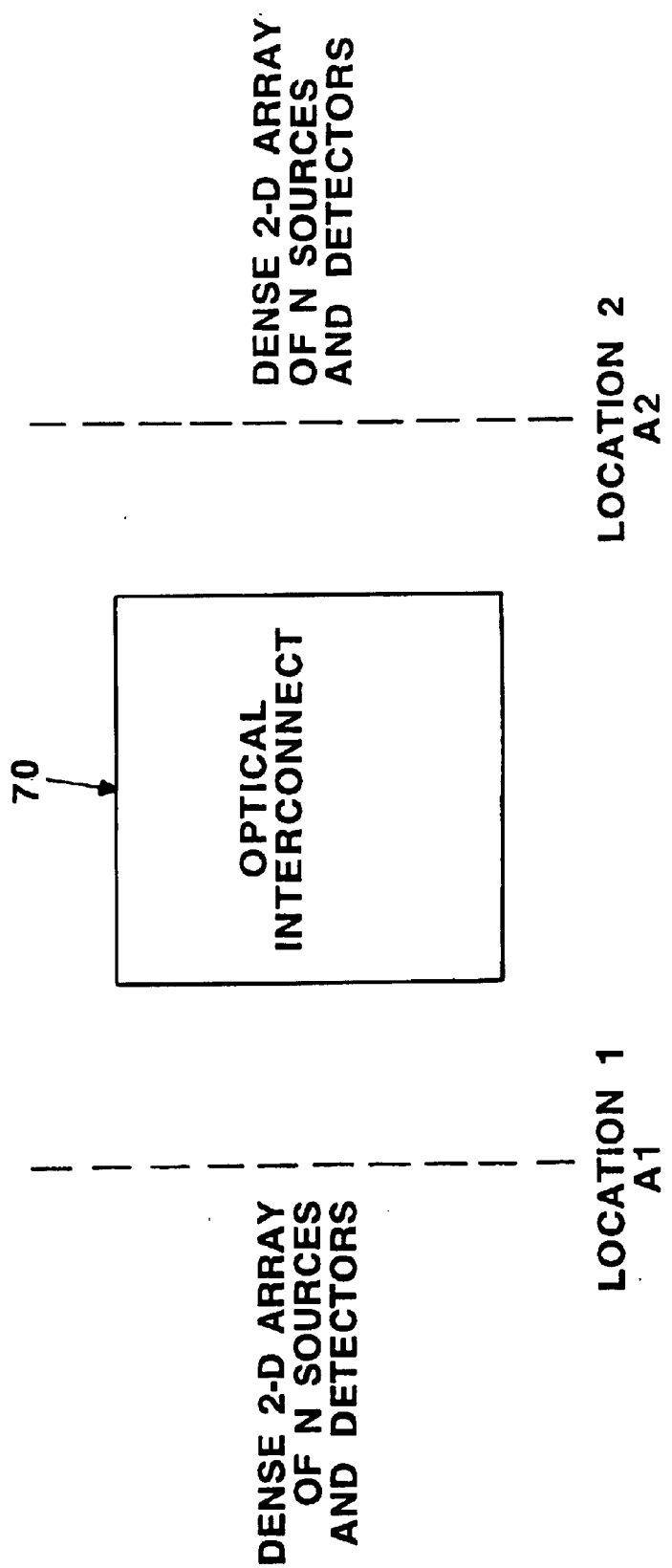
FIG. 5 is a schematic representation of the problem addressed by the optical shuffle/interconnect system of the present invention.

Reference is made to FIG. 5 of the drawings which schematically illustrates the general optical interconnection problem to which a perfect shuffle capability is added by the present invention. Here there are two planes A1 and A2 of densely packed emitters and detectors that are interconnected by an optical interconnect 70. For clarity, not shown are the drivers for the emitters and amplifiers for the detectors. In general, each of the planes contain both emitters and detectors to enable bi-directional communication. The emitters are sources of electromagnetic radiation (in this application equivalently referred to as optical radiation, optical signals, or light). The electromagnetic radiation can be modulated to carry information that originated, for example, on electrical signals, and the electromagnetic radiation has a higher frequency than that of the information it carries. For example, the emitters can be sources of electromagnetic radiation in the infrared, visible, or ultraviolet spectral bands. This emitted electromagnetic radiation can then be modulated with information including frequencies and data rates ranging from DC to many gigahertz and higher. The detectors then receive the electromagnetic radiation and extract the information usually in the form of electrical signals. The terms electromagnetic radiation, optical signals, and light are used to refer to the high frequency electromagnetic radiation carrier described above and are distinguished from the information carried by the optical interconnect system and the input and output electrical signals, which can also be electromagnetic in nature. The optical interconnect systems described below of the present invention couple electromagnetic radiation from corresponding optical channels or among mating emitters and detectors with the features described above.

Figure 6:
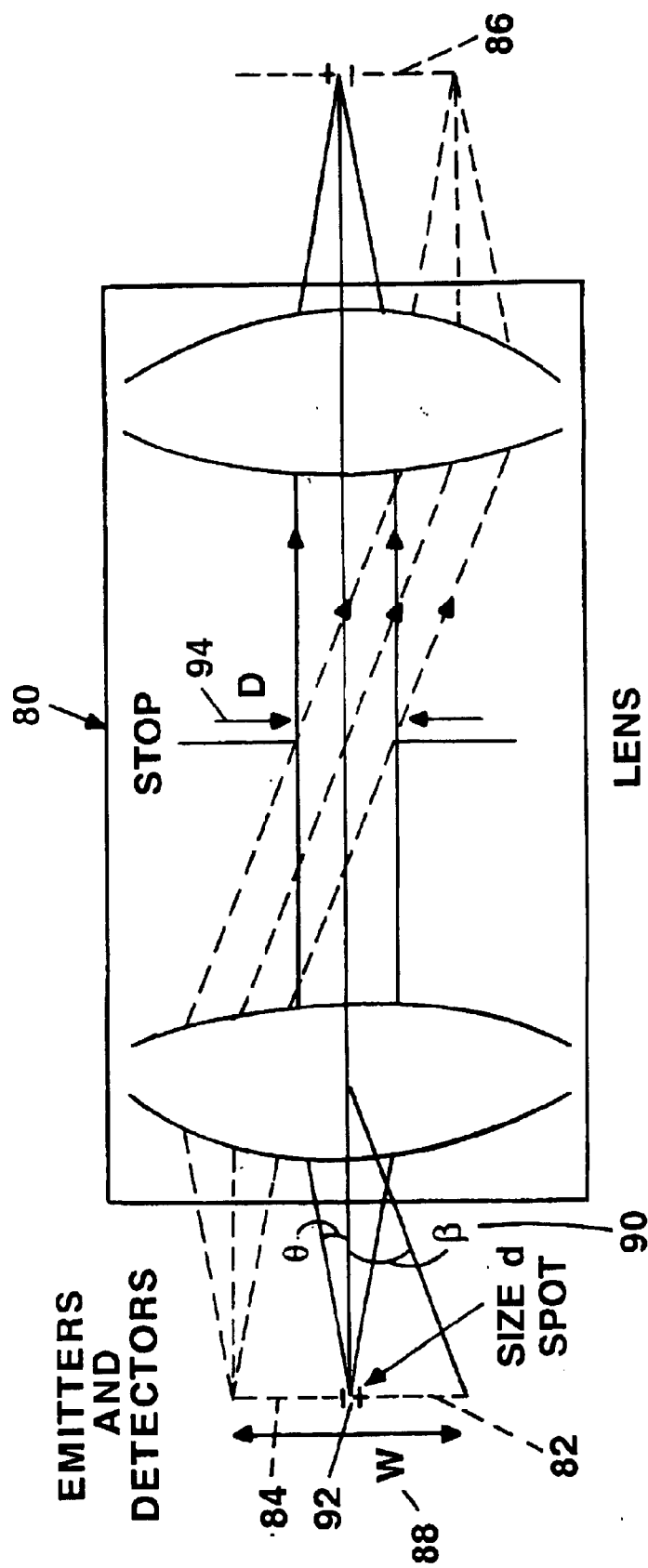
FIGS. 6 and 7 represent prior art approaches.

One of the two primary limiting approaches to this optical interconnect problem is the macro-optical approach. In macro-optics, a single optical system is used to simultaneously image the entire array of optical channels from emitter array to detector array. A typical prior art macro-optical imaging approach is illustrated in FIG. 6.

Here a single lens system 80 is used to simultaneously image many optical channels 82 between planes 84 and 86. The optical channels are arrayed in the optical field extent 88 of width W. Key parameters for such a system are the field extent W, field angle 90 of width $\beta$, spot size or resolution 92 or d, and stop 94 of diameter D.

In the classic or prior art macro-optic approach, the tradeoffs are very well defined. The lens required to maintain small spot sizes d over a large device field W grows rapidly in complexity. For example, the spot size d of even a perfect lens is limited by diffractive spreading of the light through the finite aperture of the lens. If there were no aberrations in the lens, the spot size can be shrunk as far as to the order of a wavelength of the imaged light by increasing the stop diameter D, or equivalently by increasing the numerical aperture of the system (which is proportional to the sine of θ).

However, in practice there are always aberrations present. A major goal of the design of this prior art type of interconnect lens system is to reduce the magnitude of sum of the aberrations present to the order or magnitude of the desired spot size. Rather than attempting to eliminate each of the aberrations, they are balanced so that they form a net aberration magnitude that is acceptable. In order to accomplish this difficult task, many degrees of freedom are introduced including split and multiple elements, refractive surface curvatures, spacings, glass choice, apertures, etc.

Perhaps the largest limitation in the macro-optic approach is the lack of scalability of a given lens system. If there is a diffraction limited lens system that performs acceptably with spot size d over a field of extent W, a natural approach to increasing the covered field (and thus the number of optical channels that can be interconnected) is to scale up the size of the lens system by a factor s. In this process, linear dimensions are scaled and angles are preserved. Accordingly, the larger field with the same spot size should, in principle, provide for more independent optical channels. After scaling the lens, the diffraction limited spot size remains the same. However when scaling is performed, the forms of the aberrations remain the same but their magnitude is scaled by s. As a result, the balance of aberrations that was acceptable prior to scaling is no longer adequate. The net aberration magnitudes (which were in balance with the spot size prior to scaling) can scale larger than the desired spot size. As a result of the larger actual spot sizes, the scaled up field extent W can in practice eliminate any net increase of optical channels that are interconnected. The only alternative is to redesign the scaled lens in hope of reducing the magnitude of aberrations of the larger lens to the same magnitude which the lens had prior to scaling.

A further drawback for the macro-optic approach remains. If a single lens is used to image, using finite conjugates, arrays of emitters and detectors, there is still the unreasonable alignment sensitivity between the two planes. Relative motions between either of the planes, on the order of the detector sizes, will be catastrophic.

Figure 7:
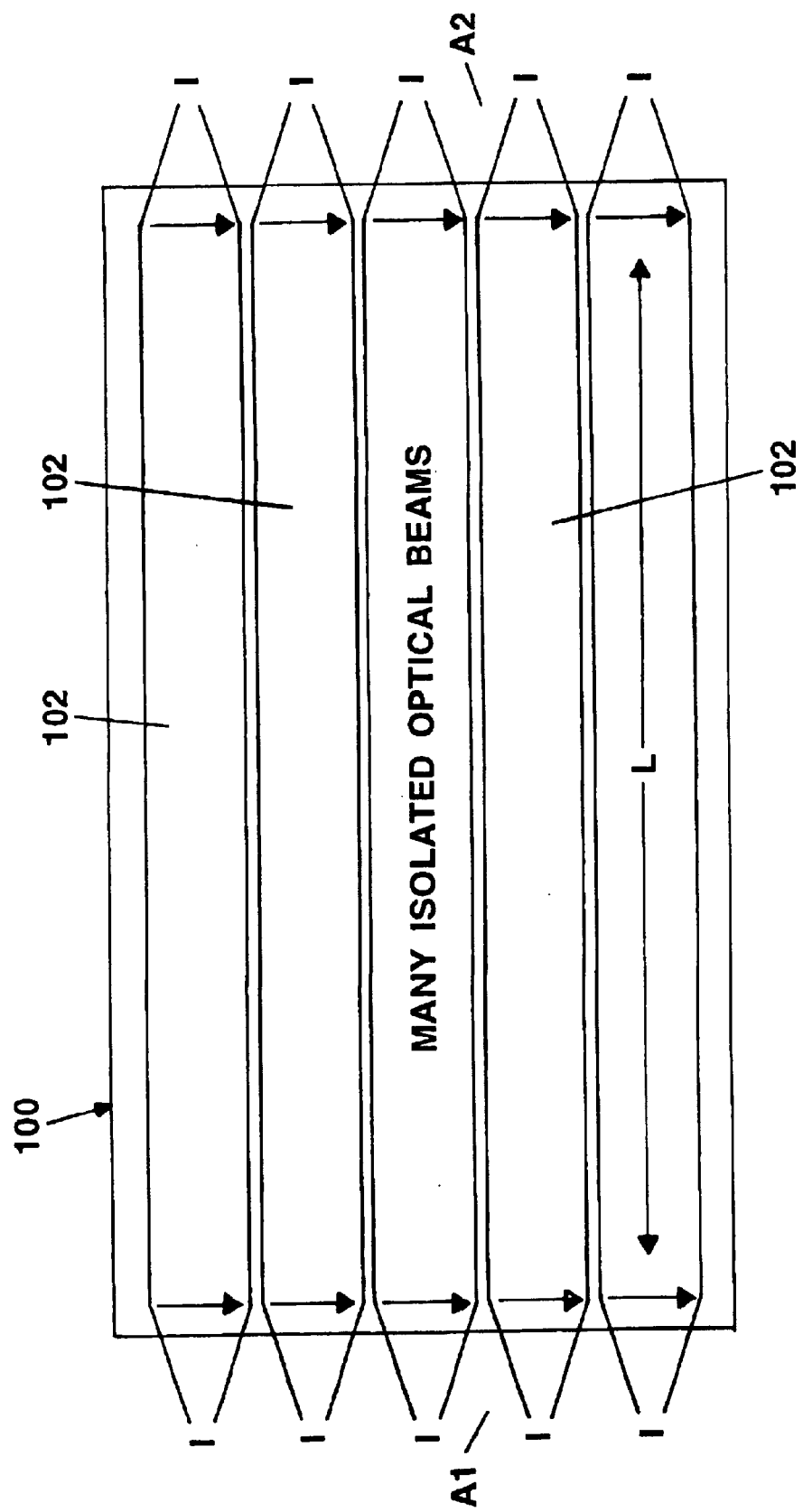

The other major limiting approach to the optical interconnect problem described above is the micro-optic approach. With micro-optics, many much-simpler parallel optical systems are used to image the many optical channels one at a time. These micro-optic elements are therefore arrayed in the parallel optical channels. This prior art approach is illustrated in FIG. 7, where two arrays of devices A1 and A2 are imaged with an array of simple refractive or diffractive micro lenses 100. The channels are interconnected by many isolated optical beams 102.

In this micro-optic limit, there is an imaging lens for each device. Since the device can be placed on the axis of symmetry of the simple lens elements, the performance of the lens does not need to be maintained over an extended field as was the case with the macro-optic limit. As a result, the complexity and size of the lens can be greatly scaled down. Further, another distinct advantage here is that there is a trivial scaling requirement, which now simply amounts to extending the size of the device array and corresponding size of the microlens array. This is in sharp contrast to the complex scaling problems in the macro-optic approach described previously.

There remains a significant problem, however, with the micro-optic approach to high density optical interconnection. This is due to the presence of diffractive crosstalk among neighboring optical channels. Diffractive spreading from the aperture of each of the microlenses causes light to couple into neighboring channels, resulting in crosstalk. The larger the aperture of the microlenses, the smaller is this diffraction spreading effect. However, since the neighboring lenses cannot overlap, reducing diffractive crosstalk forms a major performance tradeoff with density of the interconnection.

From a geometrical analysis augmented by results from diffraction theory, it can be shown that the optical signals in the parallel channels can propagate a critical distance $L_c$ before the beam, augmented by diffraction, will cross over into the neighboring channel—i.e., until the crosstalk becomes significant. This critical distance is given by:

$$L_c = D^2/2\lambda, \tag{5}$$

where D is the microlens aperture and λ is the communication wavelength.

Thus for a device spacing and microlens aperture of 100 microns, the beams can only propagate for a few millimeters before crosstalk is significant. Increasing the aperture of the microlenses results in a squared effect on the crosstalk free propagation distance, but if a large relay distance is required for the signals, the sought after high density of the optical channels must be sacrificed in order to prevent diffractive crosstalk.

Figure 8:
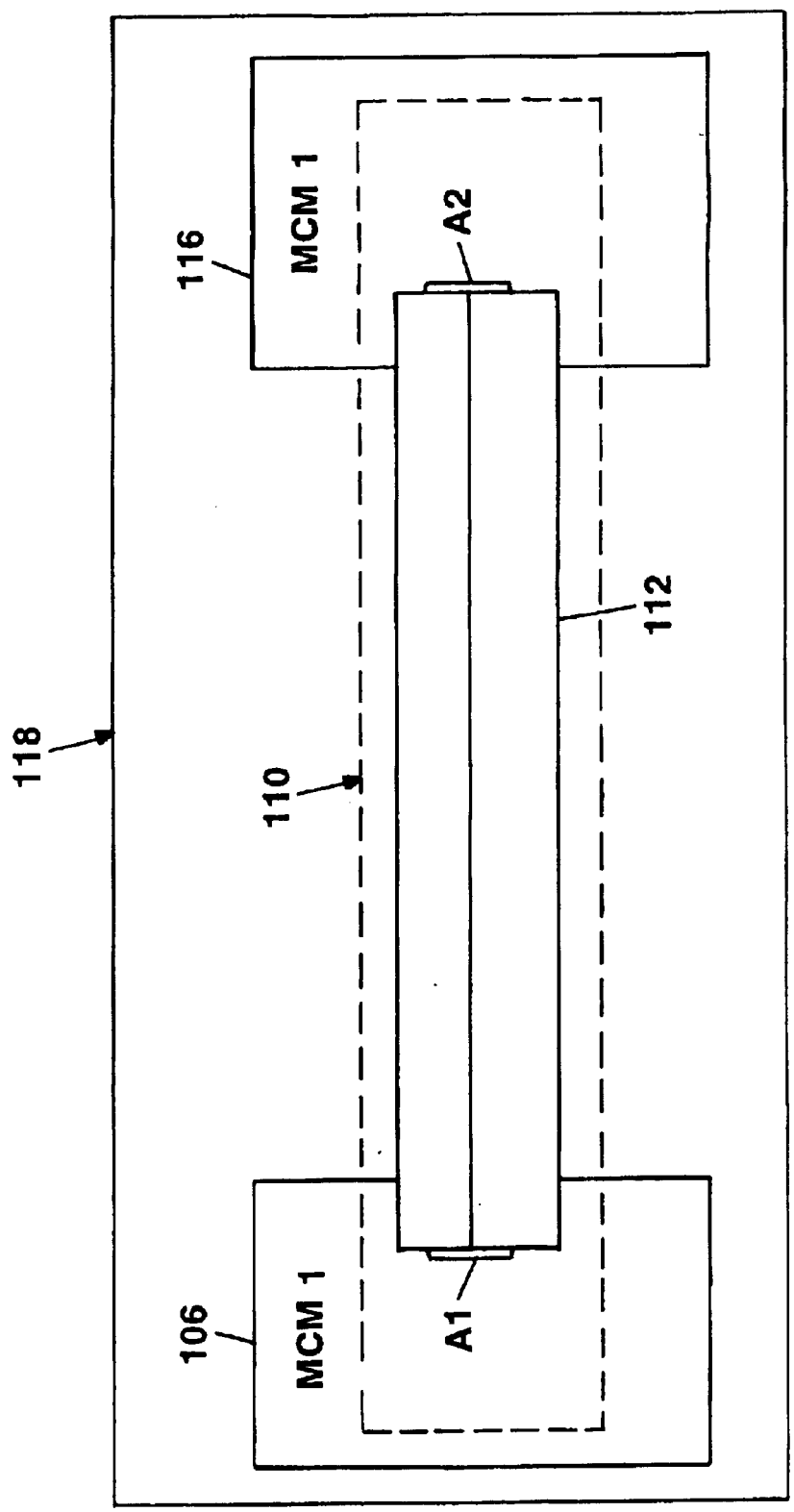
FIG. 8 is a schematic representation of a fixed point-to-point monolithic optical interconnect (optical data pipe) system used with the optical shuffle/interconnect system of the present invention.

A first preferred embodiment of the relaxed tolerance optical interconnect system used with the present invention is the fixed point-to-point monolithic optical data pipe 110 illustrated in FIG. 8, where the term optical data pipe may also be referred to herein on occasion as optical interconnect 110. Here mating interconnection planes A1 and A2, each containing emitters and/or detectors, are affixed Preferably by an adhesive "cements" on the ends of a gradient index (GRIN) rod imager 112, and this flexible pre-aligned structure is then mounted to the components 114 and 116 of host 118 which provides dense interconnection. The interconnection planes A1 and A2 can contain emitters, detectors, or general optical channel ports such as arrays of free-space channels or guided wave (fiber) channels, or the like. This device is capable of very high channel densities, on the order of hundreds along a cross section of only a few millimeters. Using demonstrated Vertical Cavity Surface Emitting Microlaser (VCSEL) technology, each of these channels is capable of multi-gigahertz data rates at these high spatial densities. The small insertion loss allows high data rates and low power consumption. Negligible temporal skews are generated once the optical signals are generated in the optical data pipe 100, independent of the length of the link (millimeters to feet). A distinct advantage of the monolithic construction of the optical interconnect or data pipe 110 is that it is very tolerant of flexure and relative misalignments between the components being interconnected.

In the optical interconnect 110 used with the optical shuffle/interconnect system of the present invention, also referred to as an optical data pipe 110, a gradient index (GRIND) rod 112 is used as a data pipe for conducting hundreds of high bandwidth optical interconnections with little crosstalk. This high density optical data pipe 100 is formed by pre-aligning and permanently affixing mated emitter and detector arrays to or near the ends of a gradient index (GRIN) rod lens imager. This rod lens images the optical channels, emitters, or detectors onto each other as conjugate image planes. The magnification can be unity or non-unity in this imaging operation. The monolithic end-to-end connection of device planes A1 and A2 and rod lens 102 forms a flexible pre-aligned structure capable of interconnecting hundreds of high bandwidth optical channels in a digital computer environment.

The gradient index rod lens 112 forms the backbone of the relaxed tolerance optical interconnect system 100 of the present invention. The rod lens 102 can be made with a broad range of diameters and lengths by controlling the gradient of the refractive index profile. The rod lens 112 is typically 0.2 mm–5.0 mm in diameter and can image with high resolution from rod face-to-rod face over distances from millimeters to many meters.

Figure 9:
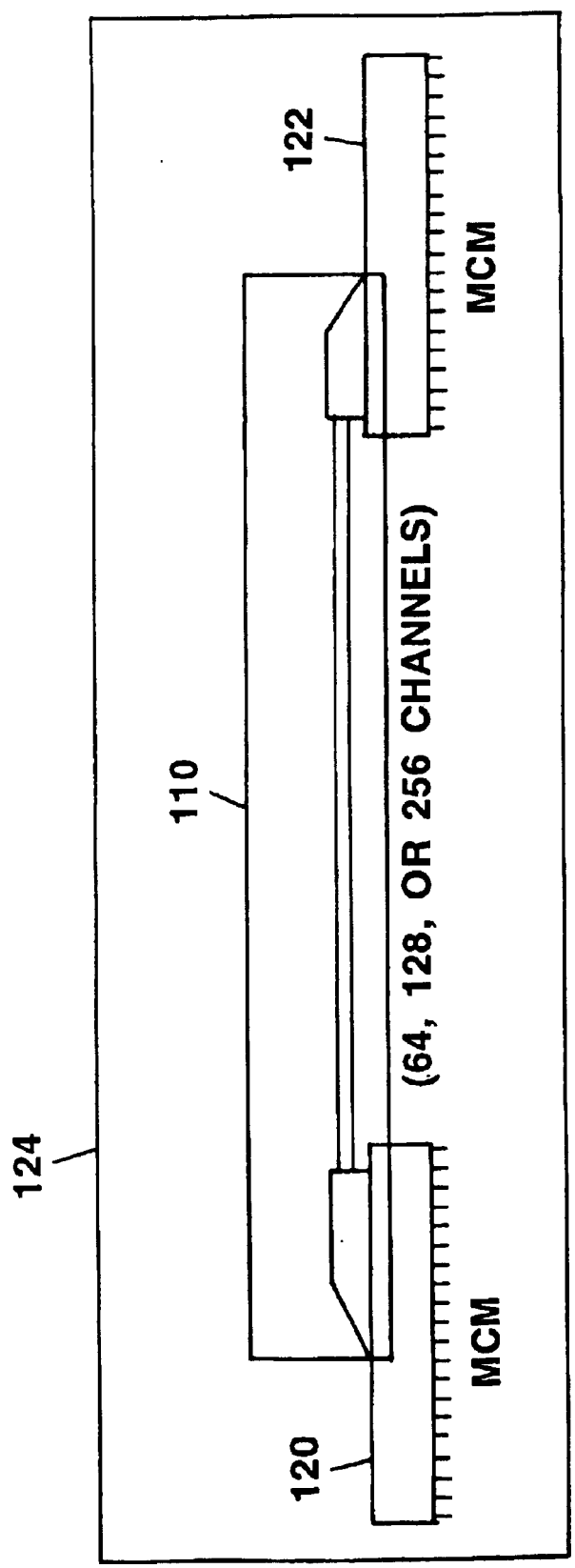
FIG. 9 is a schematic representation of a preferred embodiment used with the optical shuffle/interconnect system of the present invention.

In the optical data pipe 110, the interconnected planes A1 and A2 of optical channels are rigidly fixed as an integral part of the system. This link can then be mounted to interconnect multichip modules (MCMs), dies, or boards. This type of interconnection is illustrated in FIG. 9 where MCMs 120 and 122 are interconnected with optical data pipe 110. Similarly, drivers amplifiers, and supporting electronics can be grouped in place of MCMs 120 and 122 to form a plug-replaceable optical interconnect component 124 which is flexible and alignment tolerant. This flexible device offers relaxed alignment sensitivities with very high density of interconnected channels. For example, hundreds of multi-GHz channels can be interconnected through a cylinder that is ~2 mm in diameter and which can be several millimeters to meters long. The optical data pipe can be used for short-range or long-range (e.g., board wrap-around) high density communication that is established with transceiver modules 110 that include drivers, amplifiers, and other support for the pre-aligned emitter and detector arrays and rod lens.

The data pipe or optical interconnect used with the present invention has the benefit of relaxed alignment sensitivity since the critical elements are rigidly pre-aligned on the gradient index rod lens. Further, since the rod is flex-tolerant as shown below, misalignments and vibrations can be tolerated without interrupting the optical data communication. Additional benefits include a high channel density of high-bandwidth optical channels with negligible crosstalk or optically added signal skews, and sparse use of board real estate. This device can be used for dense short-range and long-range interconnection. An important part of this single piece optical data pipe is to pre-align and rigidly couple the emitters and detectors (in planes A1 and A2) to ends only of the flexible gradient index (GRIN) rod lens thus forming a robust data pipe which is tolerant of stresses, vibrations, and misalignments typical in high performance computer and application environments.

The optical data pipe 110, while only typically on the order of several mm's in diameter, can relay hundreds of channels over distances spanning millimeters (for MCM-to-MCM communication); several tens of centimeters (for processor array wrap-around across a board, etc.); or even meters for applications such as linking supercomputers to external memory. This high density interconnection is accomplished with low loss, and clean imaging, and extreme densities.

The channels in the optical data pipe 110 can be packed with extreme density. For example, the optical channel pitch for emitters such as vertical cavity surface emitting microlasers (VCSELs) can be 125 microns or closer and still permit simultaneous operation due to recent VCSEL technology innovations. If a 32×32 VCSEL array has a 62.5 micron pitch, 1024 optical channels could fit in a 2 mm square. The key to these higher densities lies in reducing the heat and thermal crosstalk between neighboring channels. It is expected that simultaneous CW operation of arrays such as these with smaller pitches, e.g., 125 or 62.5 micron pitches are possible.

Higher densities may also be achieved through arranging the VCSEL devices on a hexagonally packed grid. The VCSEL array may be hexagonally packed in a circular array, and for bi-directional links, emitters and detectors may be tiled in some fashion on a single die.

Figure 10A:
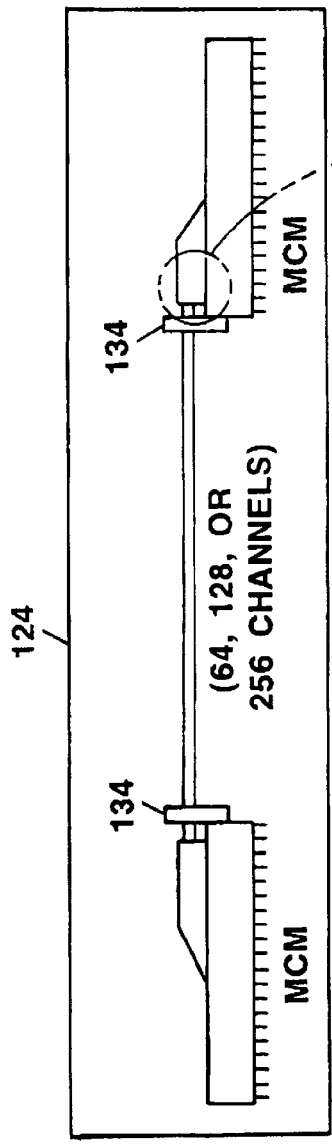
FIGS. 10A and 10B schematically and pictorially, respectively, represent a dense hexagonally packed emitter array utilized with the present invention, with FIG. 10 being an exploded view thereof.
Figure 10B:
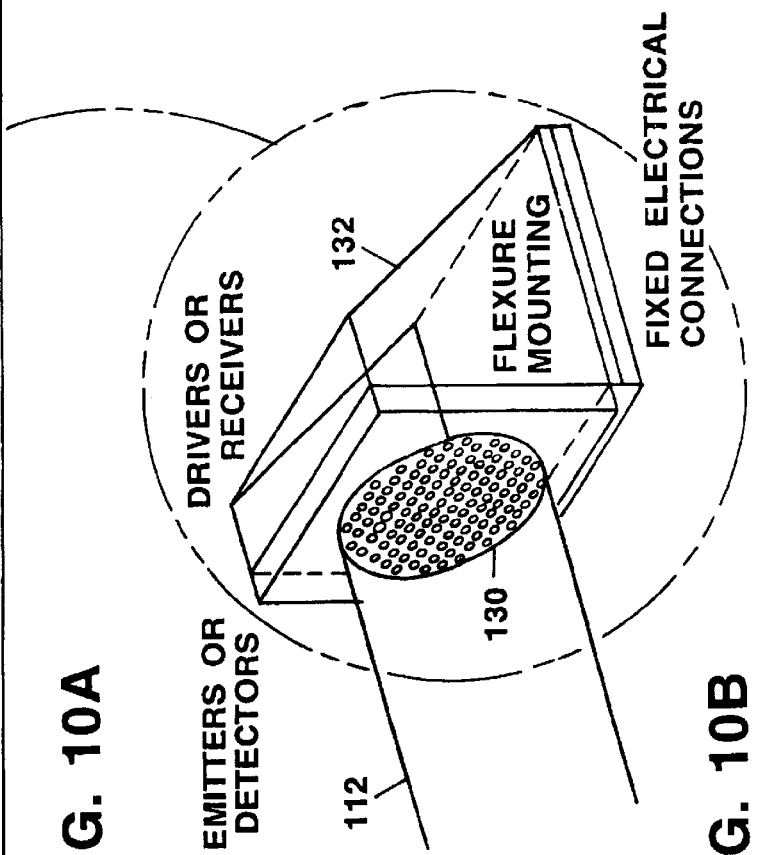

FIGS. 10A and 10B illustrate a dense circular hexagonally packed emitter array 130. Relaxed alignment tolerances are provided by either the natural flexibility of the slender GRIN rod lens, or flexure mountings 132 can be used to absorb misalignments between the MCMs and the pre-aligned optical components.

The fieldability and ruggedness of the optical data pipe or optical interconnect system of the present invention can be increased in several ways. For example, the ends of the GRIN rod lens may be rigidly affixed to the hosting MCMs. In this way, the natural flexibility of the data pipe can be used to absorb misalignments and vibrations among the circuit component ends. Accordingly the strain relief clamps 134 shown in FIG. 10A can be used to fix the GRIN rod lens rigidly to the transceiver modules, and since the GRIN rod lens is flexible, it can be used to absorb flexures and misalignments.

Figure 11:
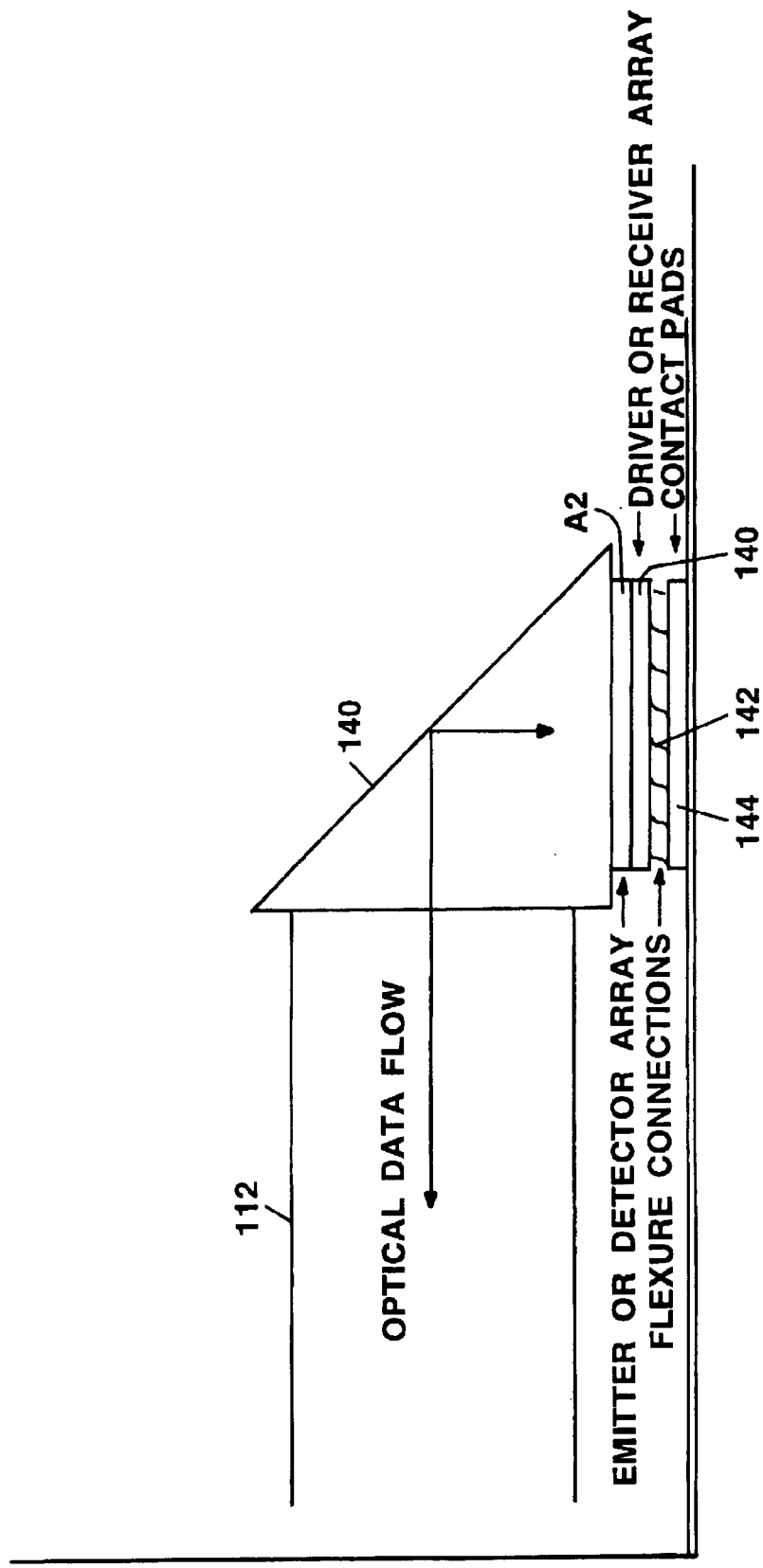
FIG. 11 is a schematic representation of a prism used with the optical shuffle/interconnect system of the present invention.

For many applications it is natural for the optical data pipe or optical interconnect system of this invention to lie parallel to a circuit board, and in those cases it may be more practical to have the emitter and detector arrays mounted parallel to the board rather than at an angle to it. This need can be accommodated by modifying the gradient profile of the rod lens so that conjugate planes are imaged off the end face of the rod. This permits the device arrays to be mounted on prisms or sub-assemblies as shown in FIG. 11. Here the end of the rod lens 112 is affixed to a prism/mirror 140 which directs the light toward the board. While the optical channel plane A2 is remote from the end of the rod 112 it is still fixed with respect to the rod end such as by cementing it to the prism/mirror 140. An array of drivers and receivers 141 can also be attached with interleaving flexible electrical connectors 142 optionally used to provide further alignment tolerance to component contact pads 144.

In FIG. 11, a prism 140 is used to fold the optical path at a right angle so the die can be more easily electrically connected to the host. Flexure connections 142 such as "s" springs can optionally be used to allow for small displacements as may be generated thermally.

Making use of the natural flexibility of the GRIN rod lens 112 is an important feature of this invention. The GRIN rod lens 112 of the optical interconnect 110 utilized with the optical shuffle/interconnect of this invention can be bent and the alignment of the channels is maintained. As the GRIN rod lens is deflected while carrying the image of an array of, for example 8 VCSELs, the output image remains essentially fixed in position on the output face. Thus when a detector array is pre-aligned and affixed on the face, certain deflections and misalignments of can be tolerated without appreciable deleterious effects on the dense interconnection of the optical channels.

Figure 12:
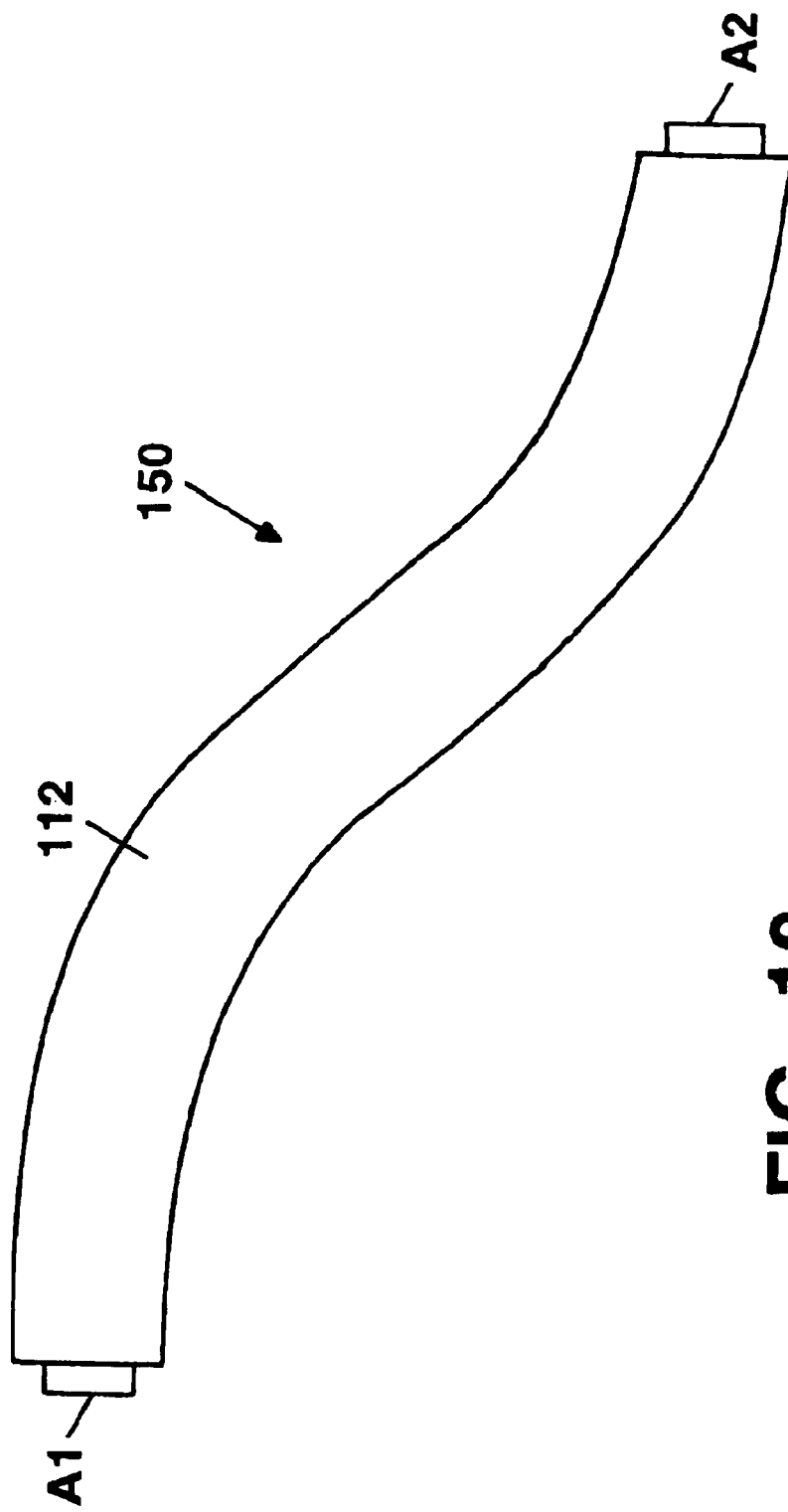
FIG. 12 is a schematic representation of an embodiment of this invention illustrating a curved optical interconnect (optical data pipe) used with the optical shuffle/interconnect system of the present invention.

A further embodiment 150 of this invention involves the use of a GRIN rod lens 112 which is curved and still capable of interconnecting optical channel planes A1 and A2 as shown in FIG. 12. This curving rod may be obtained by heating a straight rod lens.

Figure 13:
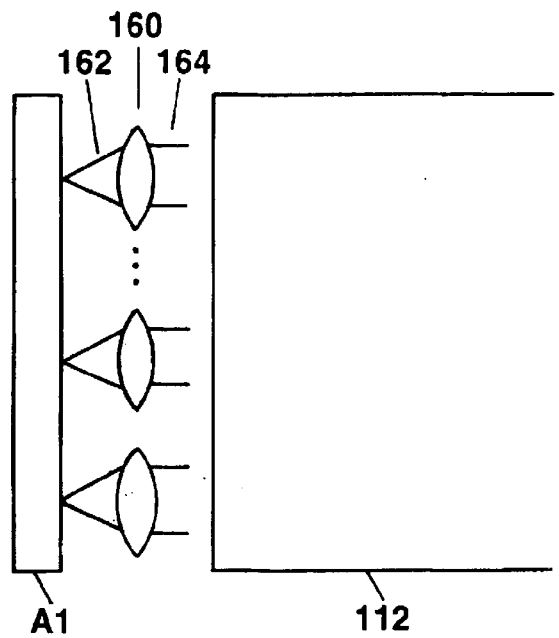
FIG. 13 is a schematic representation of micro-optic lens arrays used with the optical shuffle/interconnect system of the present invention.

In FIG. 13 micro-optic lens arrays are shown to reduce the divergence angle (numerical aperture) of the light beams (channels) 160 emanating from optical channel plane A1. The smaller numerical apertures of the light beams 162 incident on the rod lens 112 can improve the transmission through the rod lens and lower the required numerical aperture of the rod lens used in the optical data pipe. This same technique is useful for an optical interconnect system of this invention where the planes A1 and A2 are spaced apart from the ends of the rod lens. In such as case, the light beams 162 can be nearly collimated 164 and directed toward the rod lens 112 face thereby reducing or eliminating light loss.

Figure 14:
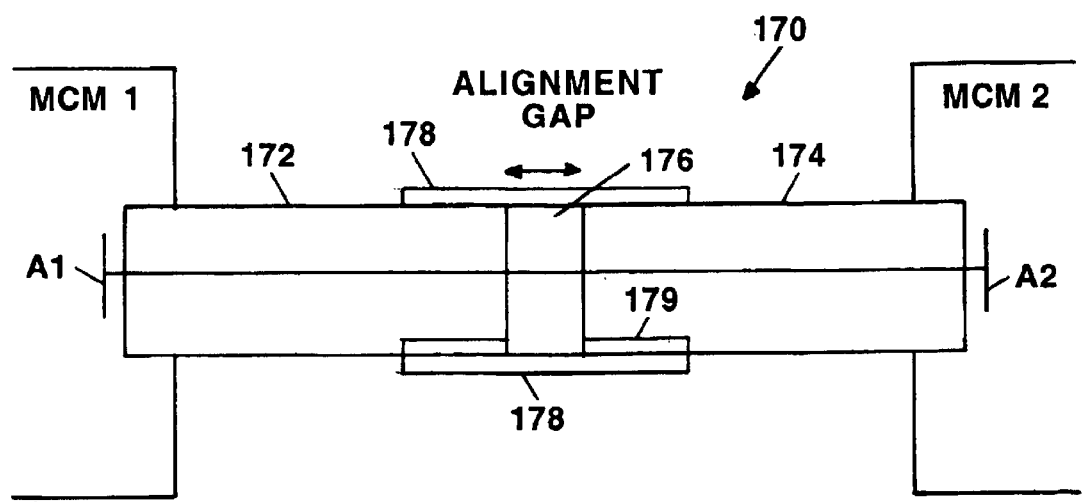
FIG. 14 is a schematic representation of another embodiment of the optical interconnect system used with the optical shuffle/interconnect system of the present invention.

Another embodiment of the relaxed tolerance interconnect 170 used with the present invention is shown in FIG. 14, which relaxes alignment tolerances by mounting symmetric infinite conjugate rod lens imagers 172 and 174 (which may be in the form of GRIN rod lenses) in pairs in front of mating optical channel planes A1 and A2. This inherently relaxes alignment sensitivities to gap width and lateral translation because beams from each channel are wide, collimated plane waves in the gap region 176. The choice of gradient index rod lenses for this device is particularly useful since the plane waves are laterally aligned in the gap region, giving rise to increased gap tolerance. Lateral shifts of the order of channel spacing in plane A1 are usually devastating in micro-optic interconnection schemes, but result in very little loss with this embodiment of the present invention. Similarly, longitudinal motions that increase or decrease the gap region 176 produce only a slow walk-off of channel throughput and do not alter the tightly focused conjugate channel imaging in planes A1 and A2. An optional alignment sleeve or collar 178 can be used to make the interconnect easily disconnectable and reconnectable. A keyed groove 179 in collar 220 can be used to prevent rotational misalignment.

The relaxed tolerance approach of this invention as shown in FIG. 14 results in wide insensitivity to lateral and longitudinal misalignments (parallel and perpendicular to the direction of the alignment gap), which is critical for practical application. While sensitivity to tilts between the two interconnection planes still exists, proper choice of detector size and data pipe design can provide tilt tolerances which are much larger than one would expect and which are easily wide enough for many board-to-board applications. If desired, spacers may be used (see below) in some configurations to reduce the presence of tilts. Alternatively if a collar 178 with keyed grooves 179 (optional) to prevent unwanted rotation is used but kept much shorter than the rod lens lengths, the same type of flexure benefit obtained in the optical data pipes described in earlier embodiments is retained since the rods can flex. Such flexure here too is with no ill effects since the collar maintains the alignment at the infinite conjugate interface region where gap width tolerances are also relaxed. This "cutting" of the optical data pipe or optical interconnect system 170 at infinite conjugate locations of the internal imaging adds an additional longitudinal alignment compliance to the system described earlier.

Figure 15:
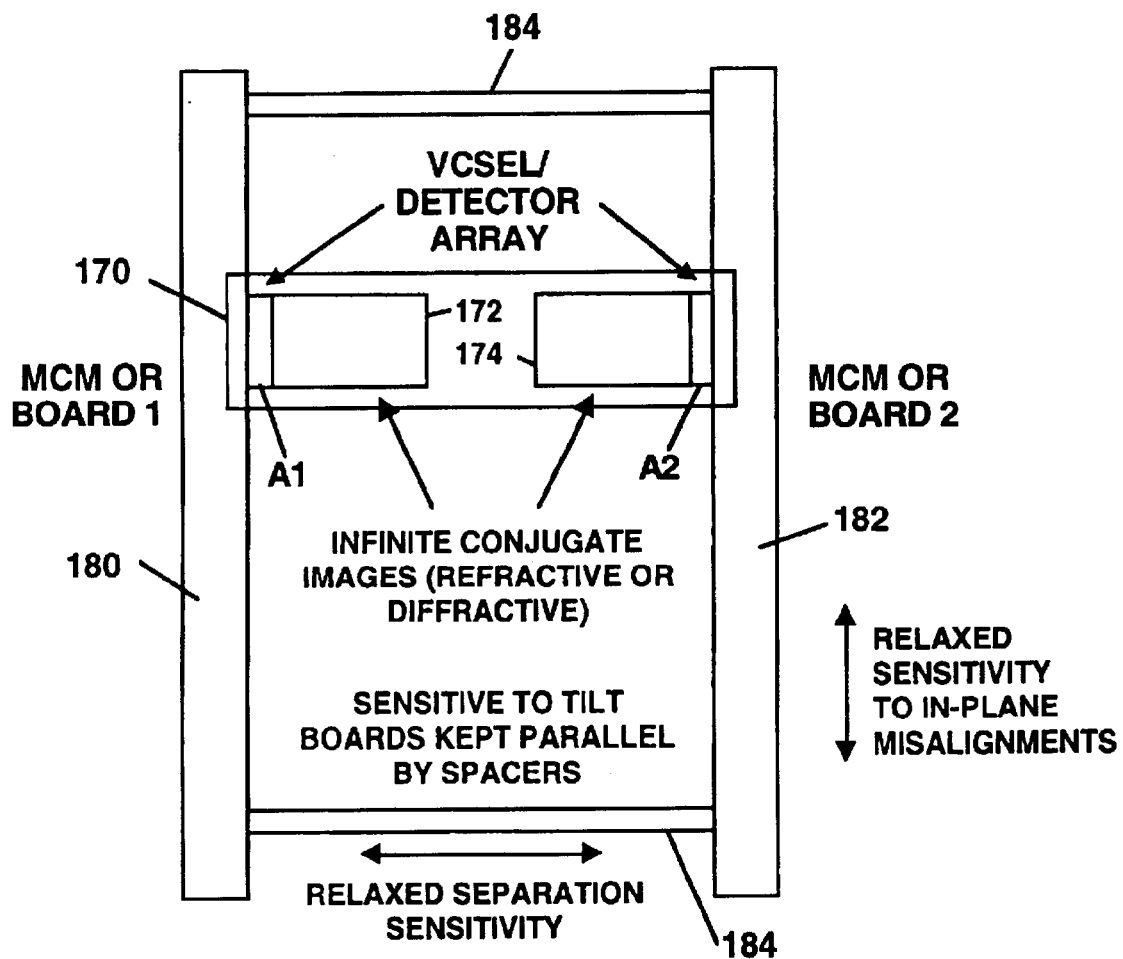
FIG. 15 is a schematic representation of a relaxed tolerance interconnect system used with the optical shuffle/interconnect system of the present invention linking channels between boards or MCM's.

The relaxed tolerance interconnect 170 of FIG. 14 can be used to provide parallel optical interconnection from board to board and similar scenarios. For example, FIG. 15 illustrates the relaxed tolerance interconnect system 170 linking channels between boards or MCMs 180 and 182. If no collar 178 is used, spacers 184 may be used to keep the boards parallel and thus angularly aligned.

Based upon the above analyses of the optical perfect shuffle approach of above-identified U.S. Pat. No. 5,892,620 and the relaxed tolerance optical interconnect (optical data pipe) approach of above-identified U.S. patent application Ser. No. 09/425,551, both of which being incorporated herein, the present invention provides an optical rearranging system also referred to as an optical shuffle/interconnect system. The optical shuffle/interconnect systems 200, 300, 400 and 500 of the present invention (see FIGS. 16–19) overcome problems associated with compactness, durability, inherent alignment tolerance, tolerance of flexure, and ease of fabrication.

Figure 16:
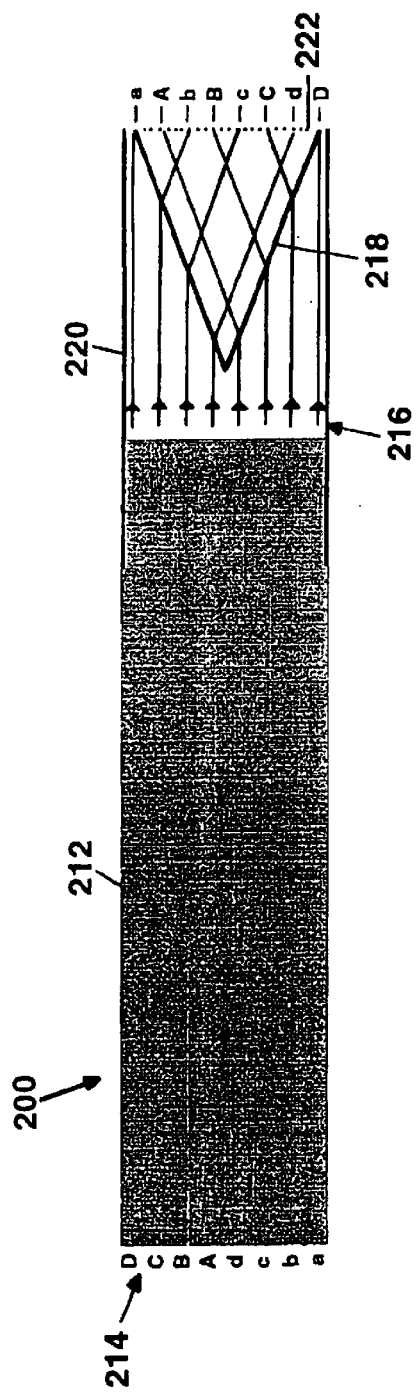
FIG. 16 is a schematic representation of the optical shuffle/interconnect system of the present invention.

More specifically, FIG. 16 schematically illustrates optical shuffle/interconnect system 200. In the optical shuffle/interconnect system 200, a gradient index rod lens 212 images the source object or array or beams or optical channels 214 (also referred to as an object) into an aerial image located near detector or output plane 222 that is located off the exit face by a distance sufficient to allow insertion of the perfect shuffle tent or device 218. The aerial image 216 that has nearly but not quite reached focus or, alternatively, is just within the depth-of-focus of the image plane is shown entering the shuffle device 218. The shuffle device or tent 218 is made up of surfaces that can be either refractive or diffractive as described earlier. A mount 220 such as a sleeve is used to affix the perfect shuffle tent 218 and optional detector array in detector/output plane 222 on to the end of the rod lens 212. Mounting the perfect shuffle tent 218 and detector 222 on to the end of the gradient index rod lens 212 allows the system to take advantage of the natural flexibility of the rod lens 212 while maintaining the alignment of the perfect shuffle optical data pipe 212. Rod lenses 212 can maintain high resolution with relatively low numerical apertures and themselves are very compact. In addition, it is easy to fabricate long imaging gradient index rod lenses 212 that can result in the distinct advantages associated therewith and described above. As stated before, these advantages can include compactness, long depths of focus, and effective telecentricity. The regions following the rod lens 212 and on either side of the perfect shuffle tent or surfaces 218 can be free space or filled with a transparent material such as a polymer or glass.

The perfect shuffle tent or device 218 can be made of diffractive and/or refractive deviation elements as described earlier. There can be an air gap between the end of the rod lens 212 and perfect shuffle tent 218 or, alternatively, this region may be filled with a conventional transparent material to provide a monolithic device.

Figure 17:
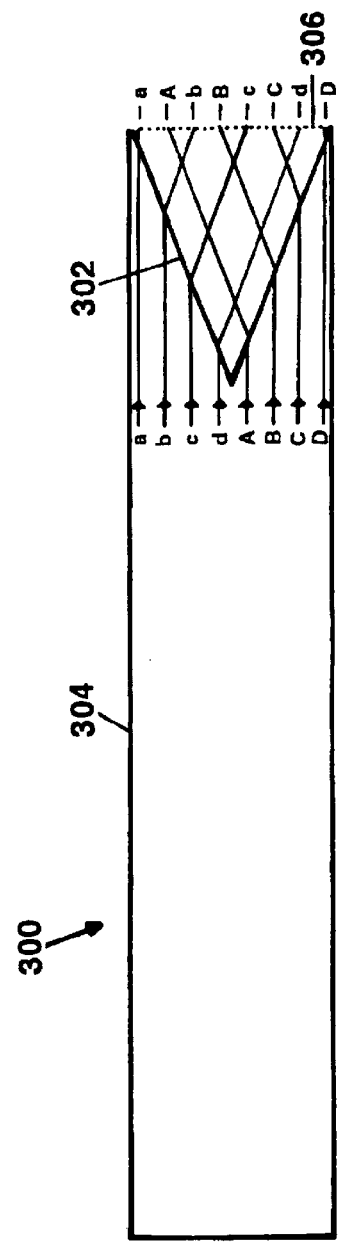
FIG. 17 is a schematic representation of an alternate embodiment of the optical shuffle/interconnect system of the present invention in which the perfect shuffle tent is incorporated directly in the optical data pipe.

FIG. 17 schematically illustrates a further embodiment of the optical shuffle/interconnect system 300 of the present invention in which the perfect shuffle tent 302 is incorporated directly into the optical interconnect or data pipe 304. In the optical shuffle/interconnect system 700 shown in FIG. 17, one end of a gradient index rod lens 304 is shaped to incorporate the perfect shuffle tent 302. Diffractive elements may be incorporated on these shaped (e.g., slanted or curved) surfaces, and the detector array 306 can then be placed on the exit end of the optical data pipe 304. This embodiment maintains the features of flextolerance of the embodiment shown in FIG. 16. The output/detector plane 306 can also be located on a shaped or curved locus in order to trade off the complexity of requiring gradients that provide imaging on a flat exit field.

Figure 18:
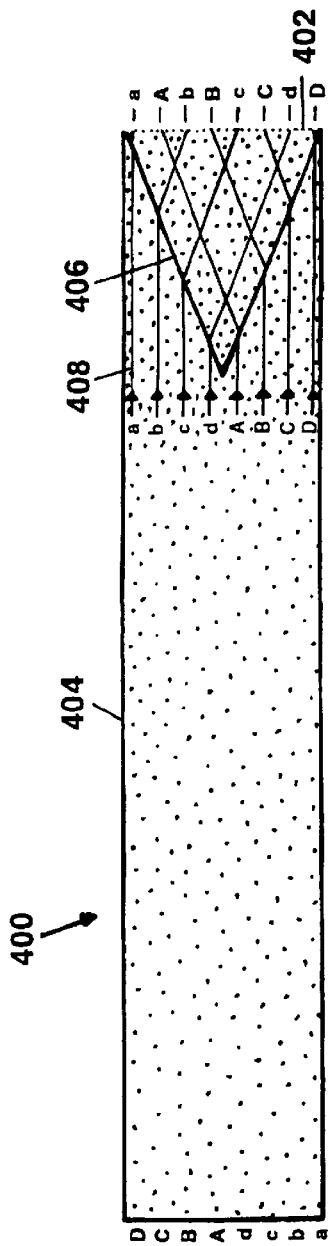
FIG. 18 is a schematic representation of another embodiment of the optical shuffle/interconnect system of the present invention in which the perfect shuffle tent is incorporated directly in the optical data pipe.

FIG. 18 schematically illustrates a further alternate embodiment of the present invention, that is, optical shuffle/interconnect system 400, in which a refractive and/or diffractive perfect shuffle tent 406 is incorporated directly into the gradient index rod lens 404 as in FIG. 17, but now the volume under the tent 406 is filled with a transparent material. An optional detector array in output/detector plane 402 is used to detect the imaged channels. In this approach a composite technique is used to incorporate the perfect shuffle tent 406 within the system. Here the aerial distribution of the channels in plane 408 is re-arranged or deviated into the shuffled distribution in exit plane 402. Detectors may be used in plane 402 to convert the optical channels into electrical signals.

For example, perfect shuffle tent 406 can be manufactured by grinding and polishing a shaped refractive boundary directly into the rod lens end 408, and then filling the region with a high-index fill material. Since the rod lens 404 typically has a radial gradient, the shape may not have flat surfaces or the fill material may have a gradient index. Alternatively, gratings can be placed on the tent surfaces and a simple index-matching wedge or fill can be inserted between the tent and a detector plane.

Figure 19:
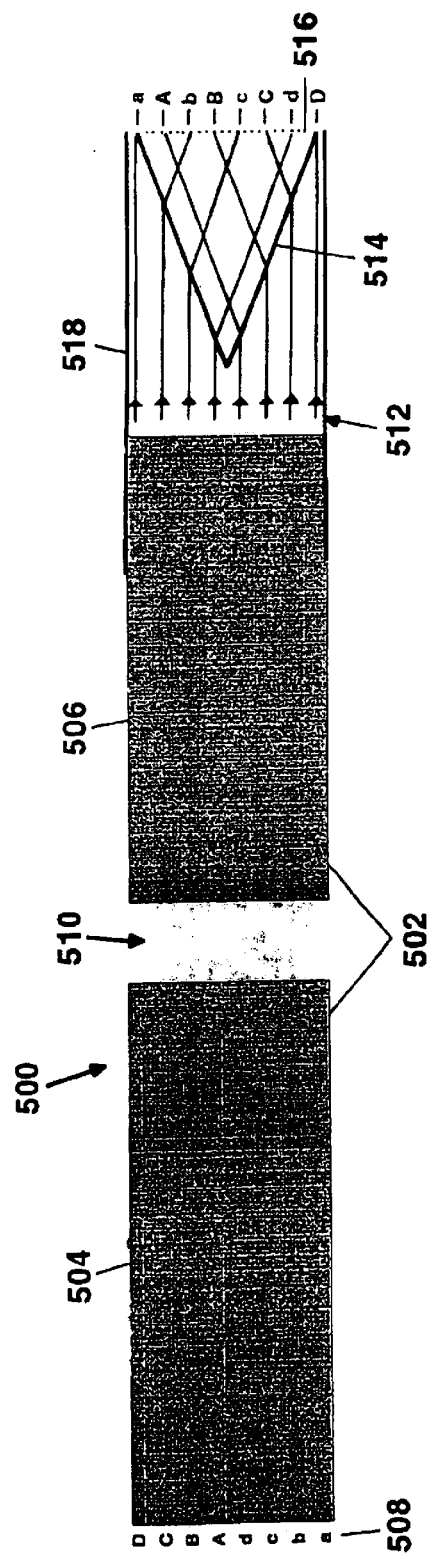
FIG. 19 is a schematic representation of a further alternate embodiment of the optical shuffle/interconnect system of the present invention in which the two-piece infinite conjugate relaxed tolerance optical data pipe optical interconnect replaces the single piece optical data pipe.

FIG. 19 schematically illustrates a still further alternate embodiment of the present invention, that is, optical shuffle/interconnect system 500, in which a two-piece "board-to-board" relaxed tolerance optical data pipe interconnect 502 replaces the single piece rod lens optical data pipe in systems 200, 300, and 400 of the present invention. In optical shuffle/interconnect system 500, two gradient index rod lenses 504 and 506 are used to form an infinite conjugate imaging system. The input object or optical channels 508 are imaged into a spectrum of angularly separated plane waves in the gap region 510. These plane waves are then imaged into the nearly focused aerial image 512 which is shuffled by the diffractive and/or refractive perfect shuffle tent 514 into the fully focused shuffled image or output channels in output/detector plane 516. The output channels may be sensed using an optional detector array in output/detector plane 516. A sleeve or collar 518 similar to collar 220 can be used to mate shuffle 514 to optical interconnect 510 or, more particularly, an end of rod lens 506. The optical shuffle/interconnect system 500 brings with it the distinct advantages of insensitivity to lateral shifts in the gap region, variations in gap separation, and relative insensitivity to tilts and rotations afforded by the board-to-board optical data pipe approach.

It should be noted that although FIGS. 16–19 show the perfect shuffle tent or device located proximate the output plane, its operation would still be effective upon interchanging the locations of the output and input planes since they are conjugate images of each other. In other words, the optical shuffle/interconnect system operates bi-directionally. Accordingly, instead of emitters in the input plane being shuffled onto detectors in the output plane, emitters and detectors can be tiled in each of the planes with light traveling in both directions through the system. The optical shuffle/interconnect systems 200, 300, 400 and 500 can be used in general in the same variations shown with respect to the above described optical shuffles and interconnects. For illustrative purposes, but not as a limitation, rather than detecting the output channels directly using detector arrays a cascadable feature can be introduced. This would allow for the advantages of the perfect shuffle optical data pipes to be extended to cascadable interconnect systems.

Although the invention has been described with reference to particular embodiments, it will be understood that this invention is also capable of further and other embodiments within the spirit and scope of the appended claims.

What is claimed is:

1. An optical shuffle/interconnect system, comprising:
    an imaging system defining an input plane and an output plane, said imaging system being in the form of a gradient index rod lens;
    means affixed to said imaging system proximate one of said planes for rearranging spatial components of an object located proximate said input plane into a rearranged image within said output plane; and
    said spatial component rearranging means comprising at least two refractive or diffractive surfaces used for said rearranging of said spatial components of said object, each of said at least two surfaces being inclined with respect to said output plane and being proximate one of said planes.

2. An optical shuffle/interconnect system, comprising:
    an imaging system defining an input plane and an output plane, said imaging system being in the form of an optical data pipe;
    means affixed to said imaging system proximate one of said planes for rearranging spatial components of an object located proximate said input plane into a rearranged image within said output plane; and
    said spatial component rearranging means comprising at least two refractive or diffractive surfaces used for said rearranging of said spatial components of said object, each of said at least two surfaces being inclined with respect to said output plane and being proximate one of said planes.

3. The optical shuffle/interconnect system as defined in claim 1 wherein said at least one said surface is either diffractive or refractive.

4. The optical shuffle/interconnect system as defined in claim 1 wherein spatial components of said rearranged image are a perfect shuffle of said spatial components of said object.

5. The optical shuffle/interconnect system as defined in claim 3 wherein spatial components of said rearranged image are a perfect shuffle of said spatial components of said object.

6. An optical shuffle/interconnect system, comprising:
    an imaging system defining an input plane and an output plane, said imaging system being in the form of a gradient index rod lens;
    means incorporated into said imaging system proximate one of said planes for rearranging spatial components of an object located proximate said input plane into a rearranged image within said output plane; and
    said spatial component rearranging means comprising at least two refractive or diffractive surfaces used for said rearranging of said spatial components of said object, each of said at least two surfaces being inclined with respect to said output plane and being proximate one of said planes.

7. An optical shuffle/interconnect system, comprising:
    an imaging system defining an input plane and an output plane, said imaging system being in the form of an optical data pipe;
    means incorporated into said imaging system proximate one of said planes for rearranging spatial components of an object located proximate said input plane into a rearranged image within said output plane; and
    said spatial component rearranging means comprising at least two refractive or diffractive surface used for said rearranging of said spatial components of said object, each of said at least two surfaces being inclined with respect to said output plane and being proximate one of said planes.

8. The optical shuffle/interconnect system as defined in claim 6 wherein spatial components of said rearranged image are a perfect shuffle of said spatial components of said object.

9. The optical shuffle/interconnect system as defined in claim 8 wherein spatial components of said rearranged image are a perfect shuffle of said spatial components of said object.

10. An optical shuffle/interconnect system, comprising:

an imaging system made up of a first component and a second component, said first component and said second component being spaced apart from one another, wherein said first component and said second component of said imaging system are each in the form of a gradient index rod lens;

one said component defining an input plane and another said component defining an output plane;

means affixed to said imaging system proximate one of said planes for rearranging spatial components of an object located proximate said input plane into a rearranged image within said output plane; and said spatial component rearranging means comprising at least two refractive or diffractive surfaces used for said rearranging of said spatial components of said object, each of said at least two surfaces being inclined with respect to said output plane and being proximate one of said planes.

11. An optical shuffle/interconnect system, comprising:

an imaging system made up of a first component and a second component, said first component and said second component being spaced apart from one another, wherein said first component and said second component of said imaging system are in the form of an optical data pipe;

one said component defining an input plane and another said component defining an output plane;

means affixed to said imaging system proximate one of said planes for rearranging spatial components of an object located proximate said input plane into a rearranged image within said output plane; and said spatial component rearranging means comprising at least two refractive or diffractive surfaces used for said rearranging of said spatial components of said object, each of said at least two surfaces being inclined with respect to said output plane and being proximate one of said planes.

12. The optical shuffle/interconnect system as defined in claim 10 wherein spatial components of said rearranged image are a perfect shuffle of said spatial components of said object.

13. The optical shuffle/interconnect system as defined in claim 11 wherein spatial components of said rearranged image are a perfect shuffle of said spatial components of said object.

14. The optical shuffle/interconnect system as defined in claim 2 wherein spatial components of said rearranged image are a perfect shuffle of said spatial components of said object.

15. The optical shuffle/interconnect system as defined in claim 7 wherein spatial components of said rearranged image are a perfect shuffle of said spatial components of said object.

* * * * *

UNITED STATES PATENT AND TRADEMARK OFFICE
CERTIFICATE OF CORRECTION

PATENT NO. : 6,914,231 B1
DATED : July 5, 2005
INVENTOR(S) : Thomas W. Stone

It is certified that error appears in the above-identified patent and that said Letters Patent is hereby corrected as shown below:

Column 16,
Line 56, "diffractive surface" should read -- diffractive surfaces --.

Signed and Sealed this

Twenty-ninth Day of November, 2005

JON W. DUDAS
*Director of the United States Patent and Trademark Office*